United States Patent
Gafni

(10) Patent No.: US 9,656,715 B2
(45) Date of Patent: *May 23, 2017

(54) CARDBOARD-BASED STRUCTURE

(71) Applicant: I.G. CARDBOARD TECHNOLOGIES LTD., Tel Aviv (IL)

(72) Inventor: Izhar Gafni, Ahituv (IL)

(73) Assignee: I.G. CARDBOARD TECHNOLOGIES LTD., Tel Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 14/425,288

(22) PCT Filed: Oct. 13, 2013

(86) PCT No.: PCT/IL2013/050824
§ 371 (c)(1),
(2) Date: Mar. 2, 2015

(87) PCT Pub. No.: WO2014/141228
PCT Pub. Date: Sep. 18, 2014

(65) Prior Publication Data
US 2015/0375822 A1    Dec. 31, 2015

Related U.S. Application Data

(60) Provisional application No. 61/787,292, filed on Mar. 15, 2013.

(51) Int. Cl.
*B62K 3/02* (2006.01)
*B62K 19/02* (2006.01)
(Continued)

(52) U.S. Cl.
CPC .............. *B62K 3/02* (2013.01); *B31D 5/00* (2013.01); *B31D 5/04* (2013.01); *B62K 19/02* (2013.01)

(58) Field of Classification Search
CPC .. B62K 3/02; B62K 19/02; B32B 3/04; B32B 29/00; B32B 29/005
See application file for complete search history.

(56) References Cited

U.S. PATENT DOCUMENTS 1,986,234 A    1/1935    Weiner
2,284,333 A    5/1942    McGirl et al.
(Continued)

FOREIGN PATENT DOCUMENTS

CN    2541301 Y    3/2003
CN    1654033 A    8/2005
(Continued)

OTHER PUBLICATIONS

International Search Report for PCT Patent App. No. PCT/IL2013/050824 (Jan. 20, 2014).
(Continued)

*Primary Examiner* — Joseph Rocca
*Assistant Examiner* — Marlon A Arce
(74) *Attorney, Agent, or Firm* — Kenealy Vaidya LLP

(57) ABSTRACT

The invention provides cardboard-based structures comprising two or more, generally elongated elements angled with respect to one another and being cut out of a multi-layered cardboard-based piece that comprises at least two layers of a single cardboard sheet folded about a longitudinal reinforcing member. The invention further provides frames, preferably human-powered vehicle frames, constructed from structures of the invention, as well as methods for producing structures of the invention.

20 Claims, 14 Drawing Sheets

(51) Int. Cl.
*B31D 5/00* (2017.01)
*B31D 5/04* (2017.01)

(56) References Cited

U.S. PATENT DOCUMENTS

| | | | |
|---|---|---|---|
| 2,393,776 A | | 1/1946 | Horr |
| 2,997,266 A | | 8/1961 | Thomas |
| 3,492,016 A | | 1/1970 | O'Connor et al. |
| 3,605,585 A | | 9/1971 | Borders |
| 3,708,101 A | * | 1/1973 | McDanield .......... B65D 81/107 206/521 |
| 3,734,389 A | * | 5/1973 | Brown ................. B65D 81/054 206/320 |
| 4,003,155 A | | 1/1977 | Raskin |
| 4,247,289 A | | 1/1981 | McCabe |
| 4,303,020 A | | 12/1981 | Houle |
| 4,399,915 A | * | 8/1983 | Sorenson ............ B65D 5/5033 206/453 |
| 4,657,795 A | | 4/1987 | Foret |
| 4,771,893 A | | 9/1988 | Liebel |
| 4,790,546 A | | 12/1988 | Mendenhall |
| 5,000,717 A | | 3/1991 | Pfeiffer |
| 5,022,666 A | * | 6/1991 | Simon .................... B62J 17/00 280/1.13 |
| 5,040,684 A | | 8/1991 | Knowles |
| 5,151,078 A | | 9/1992 | Lin |
| 5,240,267 A | | 8/1993 | Owsen |
| 5,318,742 A | | 6/1994 | You |
| 5,397,146 A | | 3/1995 | Fischer |
| 5,540,485 A | | 7/1996 | Enders |
| 5,996,510 A | | 12/1999 | Harpman |
| 6,109,638 A | | 8/2000 | Colegrove |
| 6,347,772 B1 | | 2/2002 | Hotel |
| 6,378,764 B1 | * | 4/2002 | Teixidor Casanovas . B31B 1/24 229/162.5 |
| 6,585,268 B2 | | 7/2003 | Williams |
| 6,817,621 B2 | | 11/2004 | Varan |
| 7,014,046 B2 | * | 3/2006 | Niu ..................... B65D 5/5033 206/320 |
| 7,137,517 B2 | * | 11/2006 | Lowry ............... B65D 21/0215 206/586 |
| D537,758 S | | 3/2007 | Grepper |
| 7,299,924 B2 | | 11/2007 | Robinson, Jr. |
| D561,649 S | | 2/2008 | Latham |
| D567,149 S | | 4/2008 | Grepper |
| 7,383,952 B2 | | 6/2008 | Kruelle |
| 8,191,931 B1 | | 6/2012 | Mulder |
| 8,205,366 B2 | | 6/2012 | Condor |
| 8,286,974 B2 | * | 10/2012 | Chen ...................... B62K 9/00 280/1.188 |
| D671,173 S | | 11/2012 | Tompkin |
| 8,925,949 B2 | | 1/2015 | Zecchetto |

| | | | |
|---|---|---|---|
| 2003/0111383 A1 | | 6/2003 | Qiu et al. |
| 2003/0197346 A1 | | 10/2003 | Singenberger |
| 2004/0119330 A1 | | 6/2004 | Chuang |
| 2005/0008817 A1 | | 1/2005 | Rodriguez et al. |
| 2006/0207481 A1 | | 9/2006 | McCarthy |
| 2007/0262558 A1 | | 11/2007 | Segato |
| 2008/0035819 A1 | | 2/2008 | Garfin |
| 2009/0123770 A1 | * | 5/2009 | Melville ................. B32B 25/10 428/492 |
| 2010/0078985 A1 | | 4/2010 | Mahoney |
| 2010/0148460 A1 | | 6/2010 | Nelson et al. |
| 2011/0133427 A1 | | 6/2011 | Bashan |
| 2013/0277934 A1 | | 10/2013 | De Roeck |

FOREIGN PATENT DOCUMENTS

| | | |
|---|---|---|
| CN | 1950247 A | 4/2007 |
| CN | 201080232 Y | 7/2008 |
| CN | 103144828 A | 6/2013 |
| CN | 203739534 U | 7/2014 |
| DE | 202013000837 U1 | 2/2013 |
| ES | 1074812 U | 6/2011 |
| GB | 2080767 A | 2/1982 |
| JP | S1316852 | 11/1938 |
| JP | S60-195769 U | 12/1985 |
| JP | H05170264 A | 7/1993 |
| JP | H8-91046 A | 4/1996 |
| JP | H8-133340 A | 5/1996 |
| JP | H10119965 A | 5/1998 |
| JP | 3058543 U | 6/1999 |
| JP | H11210130 A | 8/1999 |
| JP | H11-240533 A | 9/1999 |
| JP | 2000129599 A | 5/2000 |
| JP | 2001030377 A | 2/2001 |
| JP | 3102634 U | 7/2004 |
| JP | 2005512900 A | 5/2005 |
| JP | 3696756 B2 | 9/2005 |
| JP | 2009061603 A | 3/2009 |
| JP | 3172033 U | 12/2011 |
| JP | 2013527066 A | 6/2013 |
| WO | WO2011/067742 A1 | 6/2011 |

OTHER PUBLICATIONS

International Report on Patentability for PCT Patent App. No. PCT/IL2013/050824 (Feb. 12, 2015).

Viva Sarah Press; "Nimrod Elmish Interview—Cardboard wheelchair to roll out from Israel"; Israel 21c; Published: Oct. 28, 2012 (http://www.israel21c.org/cardboard-wheelchair-to-roll-out-from-israel/).

Design Hobby (Video): "Ridable Cardboard Bicycle" (Izhar Gafni), 2012 (accessable at 'http://www.shejipi.com/9665.html', or 'http://v.youku.com/v_show/id_XNDM2MzE0Mzlw.html'.

* cited by examiner

CARDBOARD-BASED STRUCTURE

This application is a National Phase filing under 35 C.F.R. §371 of and claims priority to PCT Patent Application No. PCT/IL2013/050824, filed on Oct. 13, 2013, which claims the priority benefit under 35 U.S.C. §119 of U.S. Provisional Application Ser. No. 61/787,292 filed Mar. 15, 2013, the contents of all of which are hereby incorporated in their entireties by reference.

TECHNOLOGICAL FIELD AND BACKGROUND

The present invention relates to a structure made of or comprising cardboard that may, for example, be a component in a frame, e.g. a frame of a human-powered vehicle such as a bicycle.

WO11067742 discloses a human-powered land vehicle sufficiently rigid so as to transport a human rider. The vehicle is constructed from pulpably recyclable and shreddably recyclable materials.

GENERAL DESCRIPTION

The present invention provides a structure made of or comprising cardboard. Typically, the structure provided by the present invention comprises cardboard as a major component. At times, the structure may also comprise some reinforcing members or elements made of material other than cardboard, e.g. wood, or may comprise cardboard-based elements that are articulated to one another by connecting elements made of material other than cardboard, e.g. wood, metal, etc.

Provided by one aspect of the invention is a structure comprising two or more generally elongated elements, i.e. at least a first and a second elongated elements, angled with respect to one another that are cut out of a multi-layered cardboard-based piece. The term "generally elongated" should be understood to mean that the element has a length dimension that is significantly more prominent than other dimensions of the element. The generally elongated element may have an overall shape resembling a rod, a beam, etc.

The cardboard-based piece comprises at least two layers of a single cardboard sheet that is folded about a longitudinal reinforcing member to thereby define a two-layered structure with longitudinal fold region at its end, said region comprising the reinforcing member embraced by portions of the cardboard sheet. At least a first of said elongated elements extends along and comprises at least a portion of the fold region.

The cardboard sheet may be of a kind comprising (i) at least one low-density layer made of paper, heavy duty paper or cardboard (for ease of reference the term "paper", will be used hereinafter to refer collectively to paper, heavy duty paper or cardboard) arranged to define a plurality of cells or voids, e.g., formed by corrugated, fluted or otherwise loosely packed paper sheets or strips that define a plurality of voids therebetween, and comprising (ii) one or more liner cardboard sheets lined at one side or both sides of the low-density layers (namely sandwiching the low-density layer between them). Examples of such cardboard panels are such known as "corrugated cardboard", which consists of a fluted or corrugated paper panel(s) or strip and one or two flat linerboards at one or both (i.e. sandwiching) sides of the fluted or corrugated paper; and may also be such referred to as "honeycomb cardboard". The corrugated or honeycomb cardboard sheets may be single-walled or multi-walled cardboard sheets. These terms are also meant to encompass heavy-duty cardboard of various strengths, ranging from a simple arrangement of a single thick panel of paper to complex configurations featuring multiple corrugated, honeycomb and other layers.

According to one embodiment, the at least two elongated elements are integral with one another and are cut as a single integral structure out of said cardboard piece.

By another aspect, the present invention provides a method for manufacturing a structure made of or comprising cardboard. The method comprises folding a cardboard sheet about a longitudinal member to thereby form a generally planar two-layer cardboard-based piece with a longitudinal fold region at its edge. The structure is then cutout from the planar two-layer cardboard-based piece, the structure comprises at least two integral elongated elements angled with respect to one another, at least one of which two elements extends along said fold region.

The reinforcing member has typically a substantially rounded cross-section, e.g. circular, ellipsoid or oval cross-section. The reinforcing member is typically, though not exclusively, made of cardboard or wood. Other materials, such as plastic, metal, etc. are also possible.

The first elongated element may be made to comprise substantially all or only a portion of said fold region. By some embodiments, a single cardboard piece may be used to produce two or a plurality of identical or different structures of the kind provided by the invention.

The reinforcing element that is embedded within the fold region typically extends the length of the first elongated element. By some embodiments of the invention, the structure also comprises a support element that extends between the first and the second elongated elements, typically angled with respect to both and providing additional reinforcement to the structure. The reinforcement element may also be made of cardboard and may typically also be cut out of said cardboard piece, a priori integral with the two elongated elements. However, it is also possible to construct a support element separately and connect it subsequently in a proper way to the two elongated elements.

The at least two elongated elements, even if integrally formed, may have free ends typically designed for connection to other structures or structural elements, e.g. by the use of appropriate connectors or connecting members, e.g. such that are formed or embedded within said structure.

By some embodiments of the invention, the first elongated element has a load-bearing or bend-resistance property significantly larger (e.g. at least about 5, 10, 15, and even at least about 20 times more) than that of the longitudinal reinforcing member. The structure of the invention is typically capable of supporting a load in a direction perpendicular to said first elongated element (when said first element is supported at its two ends), which is at least about 10, 15, 20 and even at least about 25 times the weight of such structure.

The structure in its entirety or its elements may comprise an external coating which may be one or more of a fire-resistant coating, liquid-resistant coating, scratch-resistant coating, and other environmental-resistant coatings.

By one embodiment, the structure as defined above is a part of a frame of a human-powered vehicle. According to one specific embodiment, the structure is configured as a part of a frame of a human-powered vehicle, e.g. a bicycle. Such frame may comprise two or more parts, one or both of which are structures as provided by the invention, which may be the same or different. For example, two elements being mirror images of one another constituting the rear frame part of a bicycle frame and a third structure constituting the front part of a bicycle frame.

By one embodiment of the invention, at least one of the elongated elements is configured for articulation to a pedal crank.

Reference is also made to the concurrently filed and co-owned PCT application, claiming priority from US provisional applications, Ser. Nos. 61/715,359 and 61/787,229, both entitled "Structural Element Comprising Cardboard" (hereinafter: "the co-owned application"), the contents of which are incorporated herein by reference. This co-owned application describes a structural element similar in its properties and manufacture to said first elongated element, mutatis mutandis.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

In the following description, although at times particular mention of a specific figure will be made, reference is mostly to the figures in their entirety.

Figure 1:
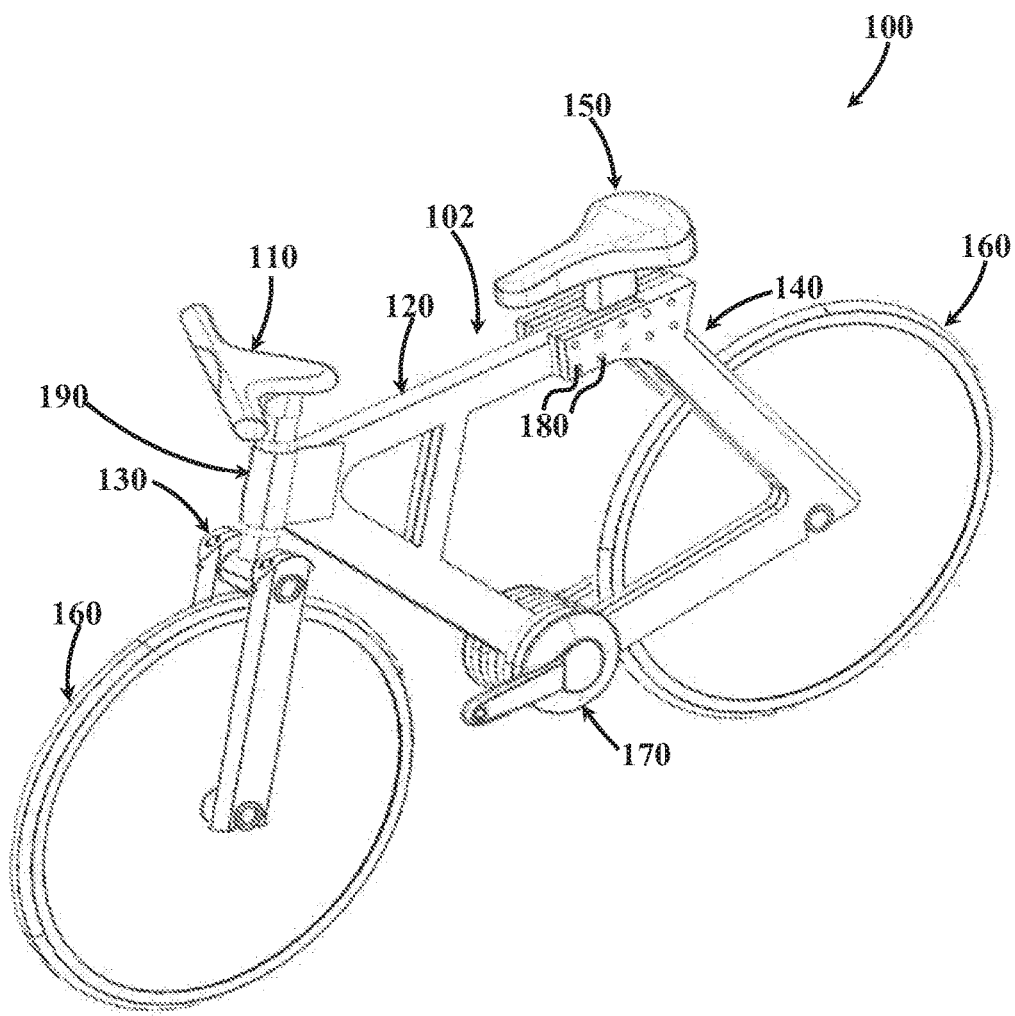
FIG. 1 is a schematic isometric view of a bicycle with a frame according an embodiment of the invention.
Figure 2:
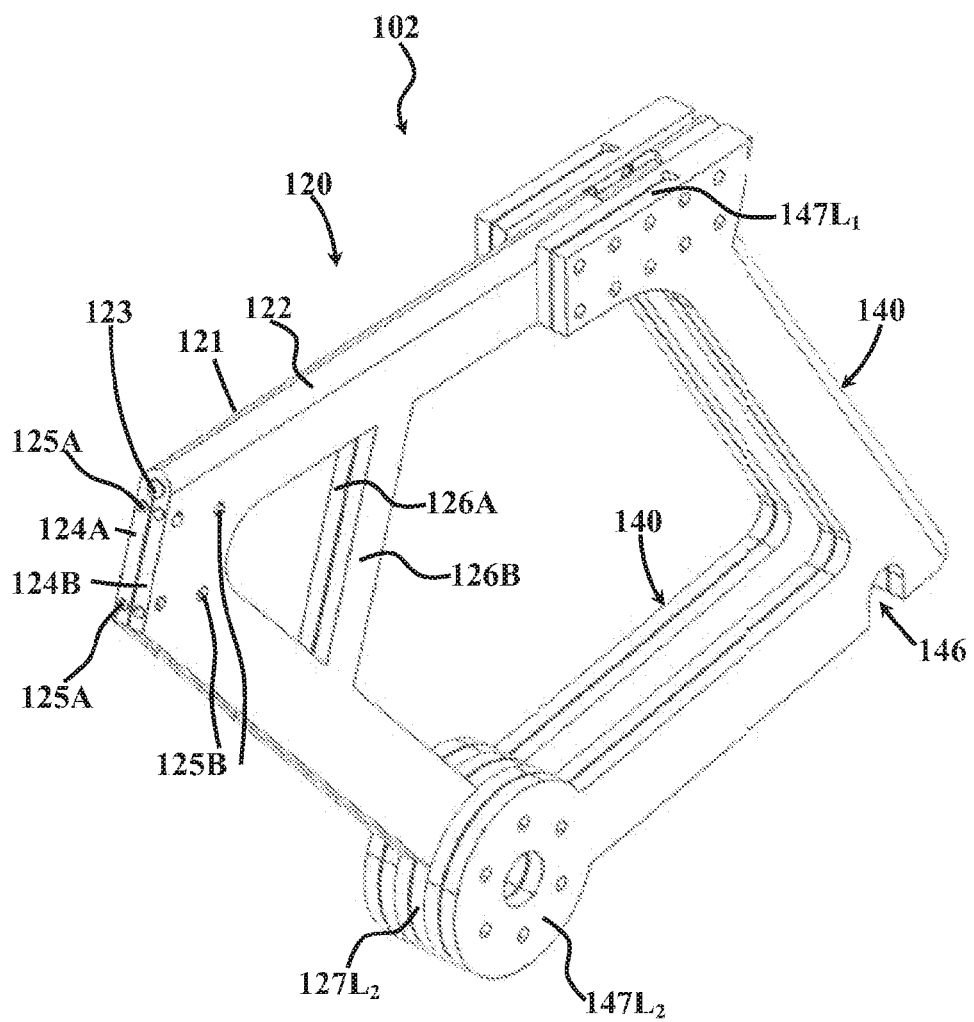
FIG. 2 is a schematic isometric view of the frame shown in FIG. 1.

Reference is first made in particular to FIGS. 1 and 2 showing a bicycle 100 having a steering arrangement 110, a frame 102, a seat 150, wheels 160 and a crank assembly 170.

The frame 102 comprises a front frame part 120 and two rear frame parts 140, the two being mirror images of one another. Each of the frame parts is made substantially of cardboard, as will also be further explained below.

As best seen in FIGS. 3A to 3E, the front frame part 120 comprises two integral elongated elements L1 and L2 and a support element 126, which is also integrally formed with the two elongated elements L1, L2.

End portions 127L1 and 127L2 of the longitudinal elements L1 and L2, respectively, serve as the site for association with corresponding elements 147L1' and 147L2' of the rear frame part 140, the bicycle seat 150 and the crank assembly 170. As can be seen, the end portion 127L2 that couples with the crank assembly has a circular shape.

Figure 4A:
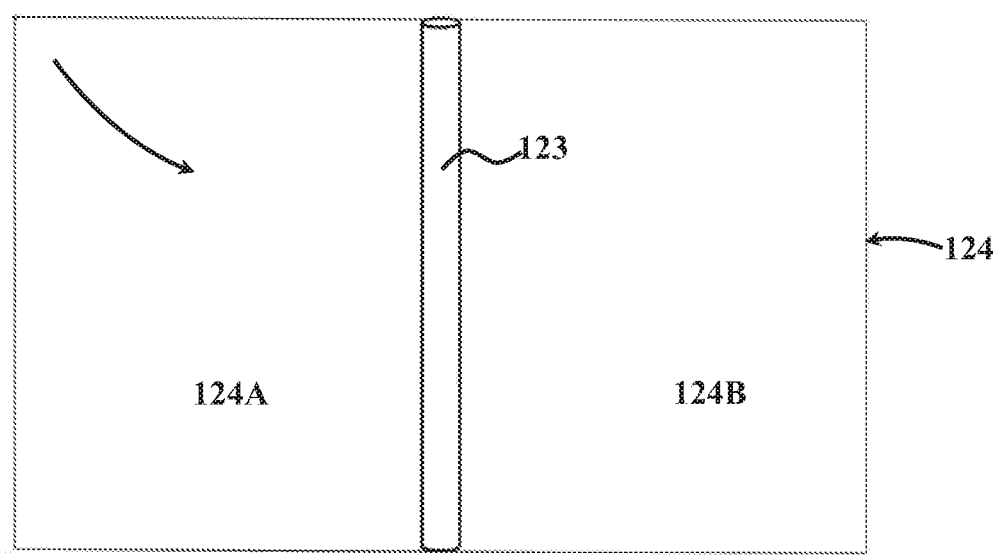
FIGS. 4A and 4B are schematic respective front and isometric views of two stages of producing the front frame shown in FIGS. 3A to 3E.
Figure 4B:
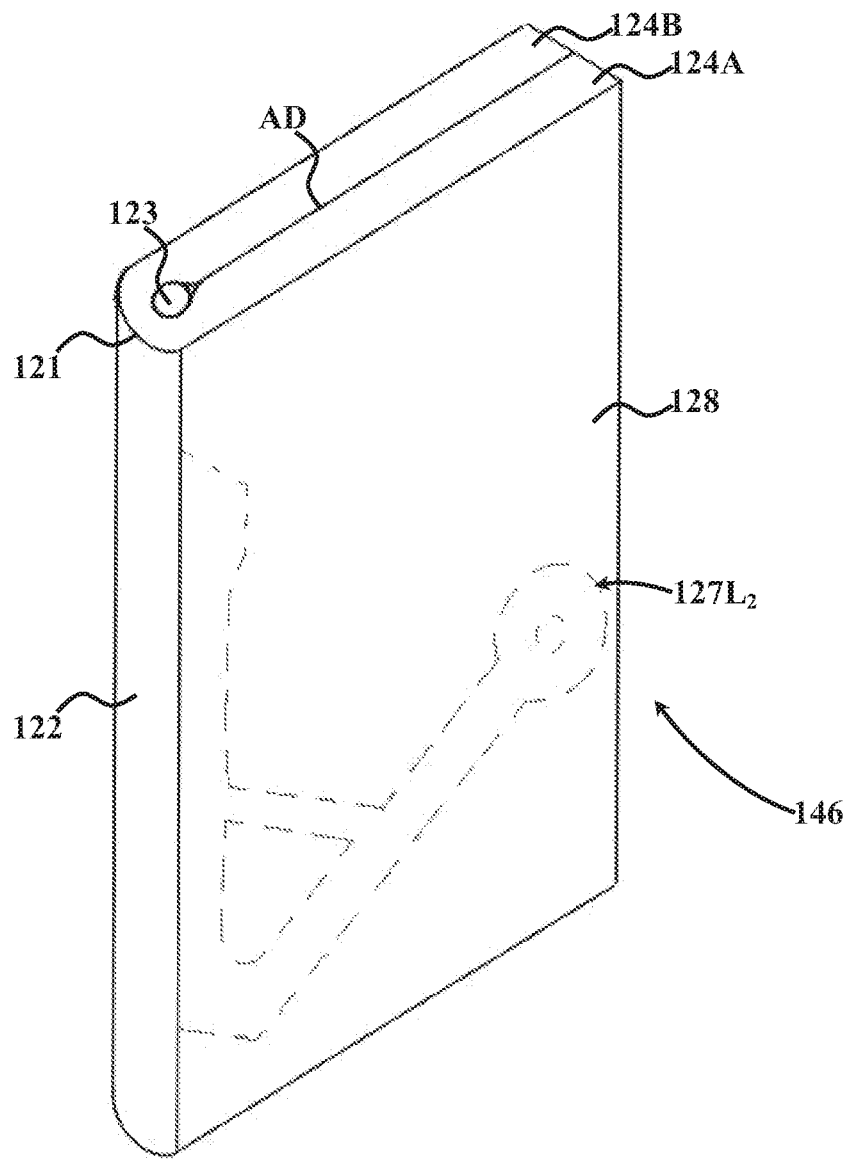

FIGS. 4A and 4B are a schematic illustration of the manner of manufacture of the front frame part 120. As can be seen in these figures, the entire front frame part 120 is made of a single sheet of cardboard 124 that is folded about a reinforcing member that is constituted by rod 123, extending along a fold region 121 of the cardboard sheet 124. The reinforcing member is typically made of cardboard but may also be made of wood, plastic and other materials. The cardboard sheet is typically a two-walled corrugated, a multi-walled corrugated or honeycombed cardboard sheet.

Once the sheet 124 has been folded, a left and a right portion thereof 124A, 124B are affixed to one another (e.g. by adhesive AD, sewing, stapling etc.) such that portions thereof firmly embrace and close around the reinforcing rod 123 and form at least a double-layer pre-production cardboard-based piece 128. The pre-production structure shown in FIG. 4B can then be cut to the required shape, shown in this example (by dotted lines) to be the shape of the front frame part 120.

Consequently, the elongated member L1 has the reinforcing rod 123 passing along the full length thereof and includes the fold region 121, whereas the elongated element L2, as well as the supporting element 126, is formed of a double-layer cardboard without a reinforcing rod passing therethrough.

Figure 3A:
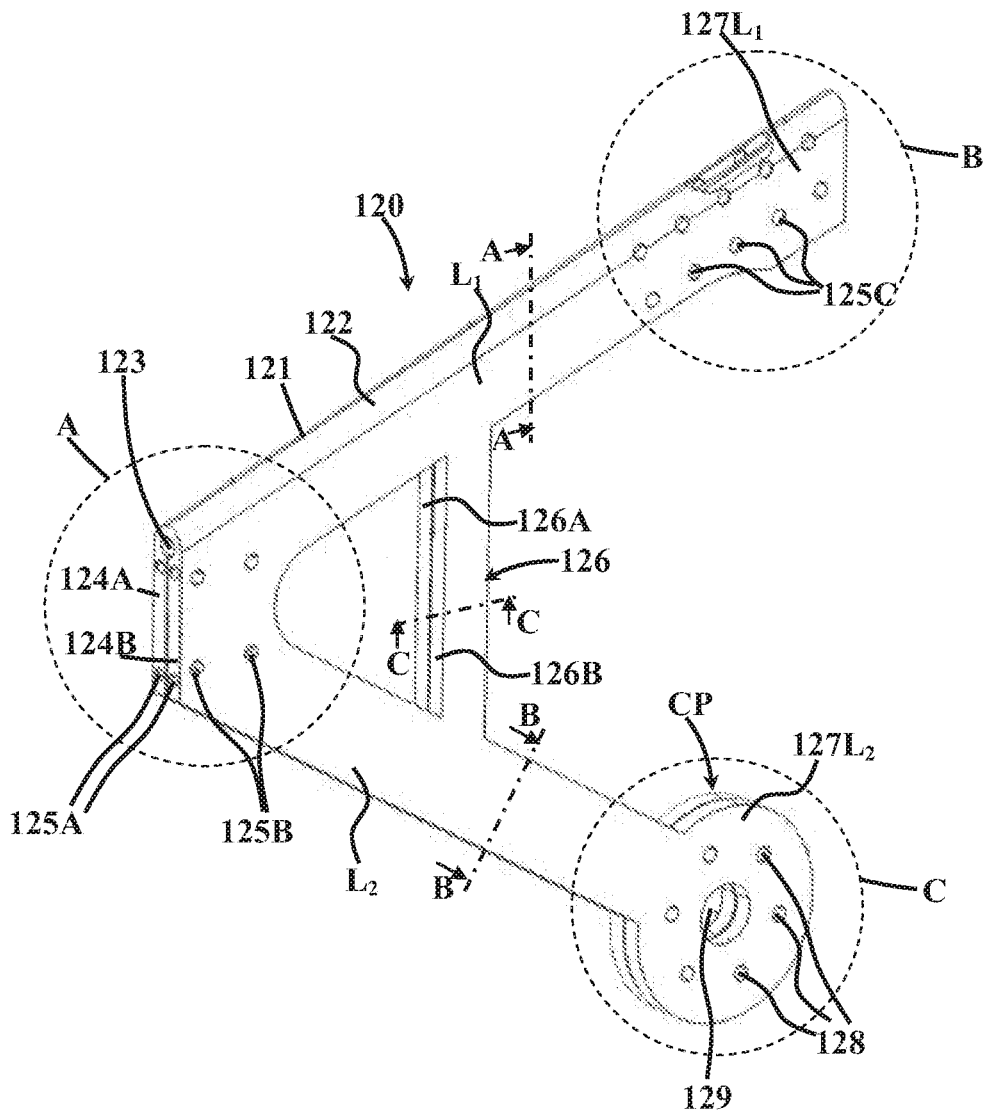
FIG. 3A is a schematic isometric view of a front frame component of the frame shown in FIG. 2.
Figure 3B:
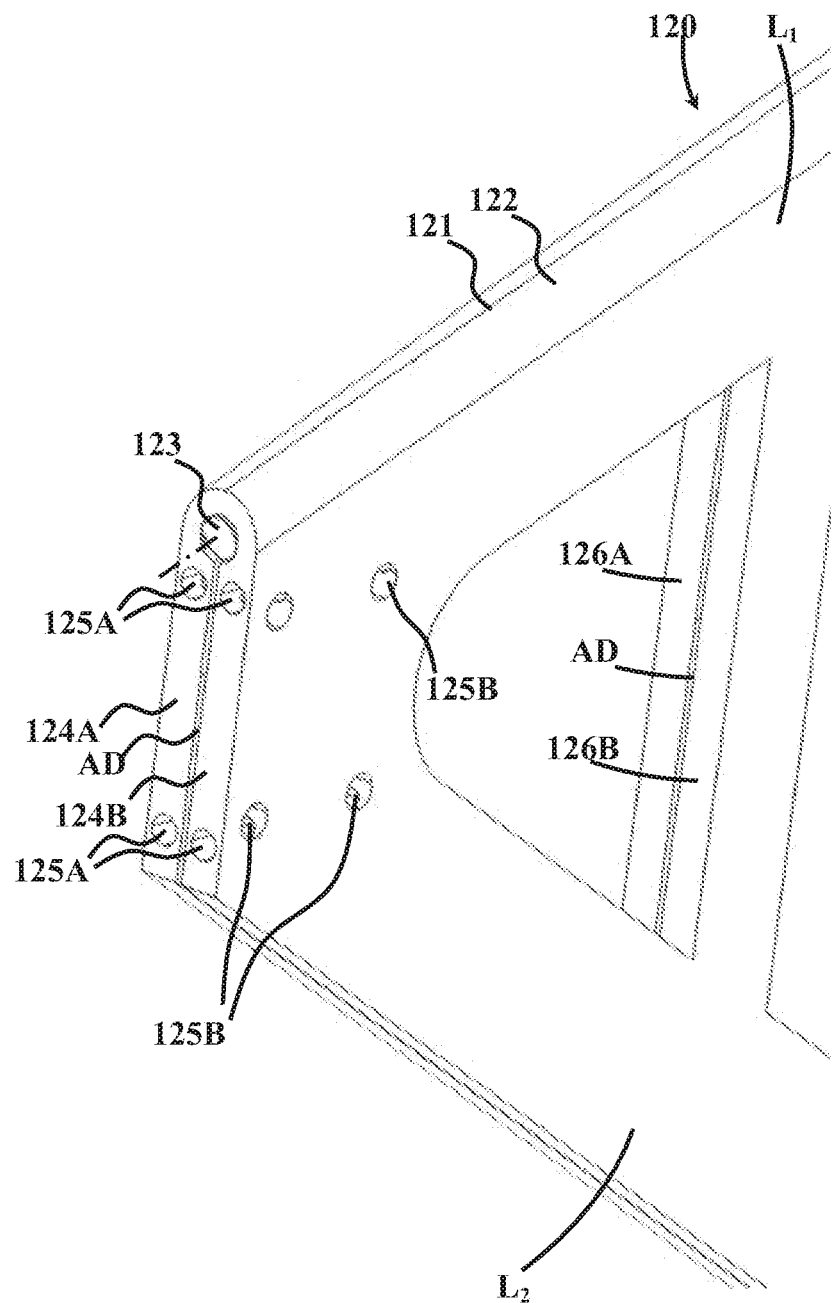
FIG. 3B is a schematic enlarged view of a detail A shown in FIG. 3A.
Figure 3C:
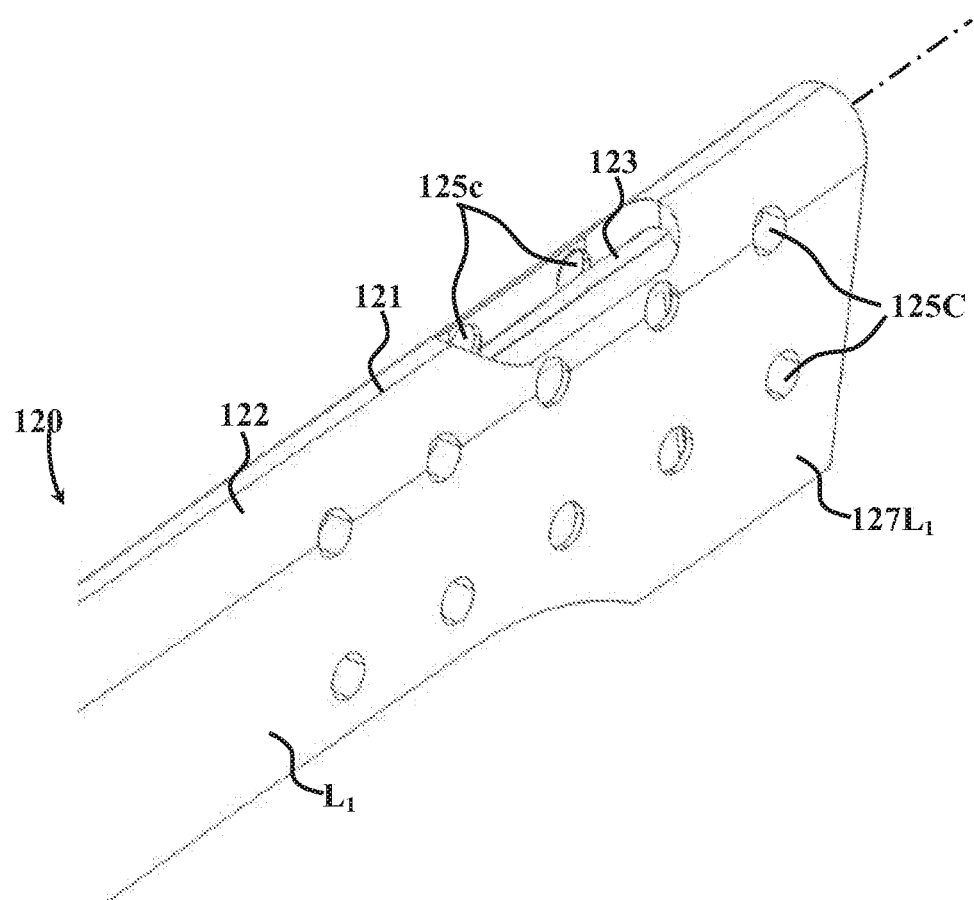
FIG. 3C is a schematic enlarged view of detail B shown in FIG. 3A.
Figure 3D:
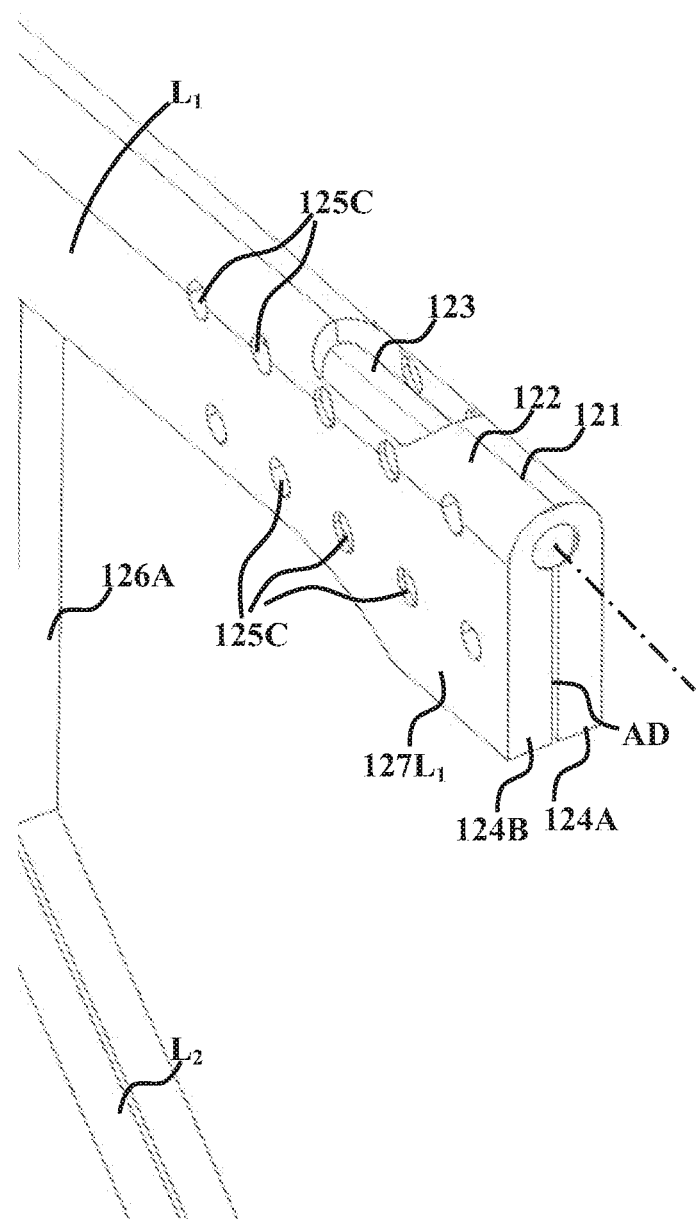
FIG. 3D is a schematic rear view of detail B shown in FIG. 3C.
Figure 3E:
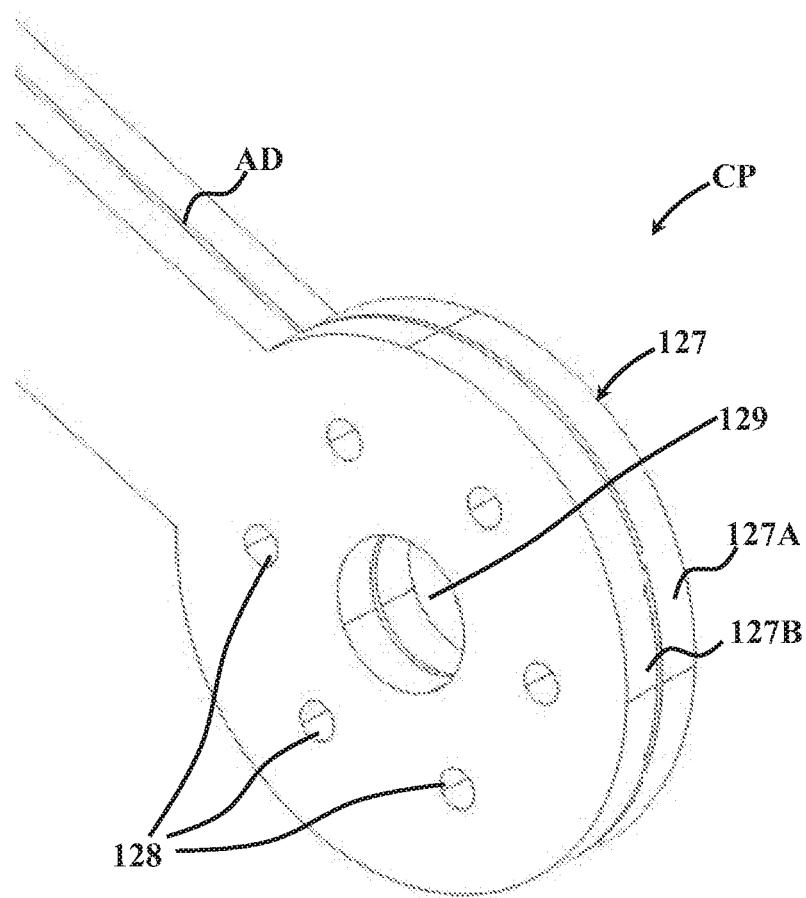
FIG. 3E is a schematic enlarged perspective view of detail C shown in FIG. 3A.
Figure 3F:
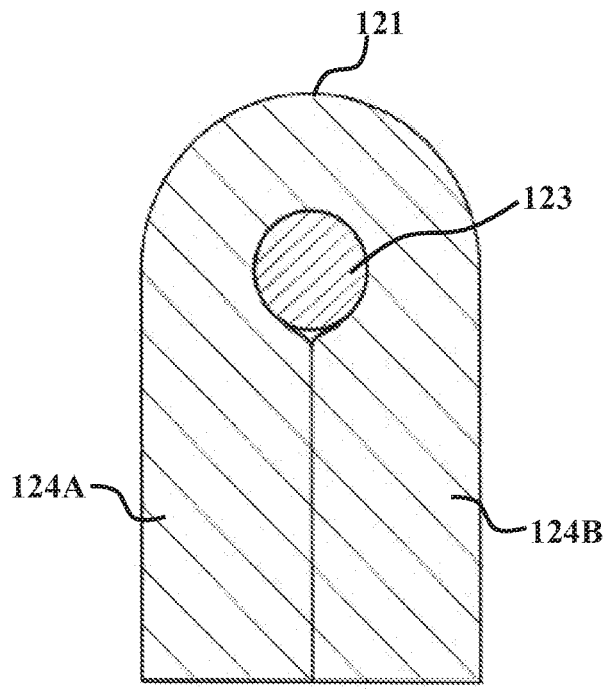
FIGS. 3F to 3H are schematic section views taken along lines A-A, B-B and C-C shown in FIG. 3A.
Figure 3G:
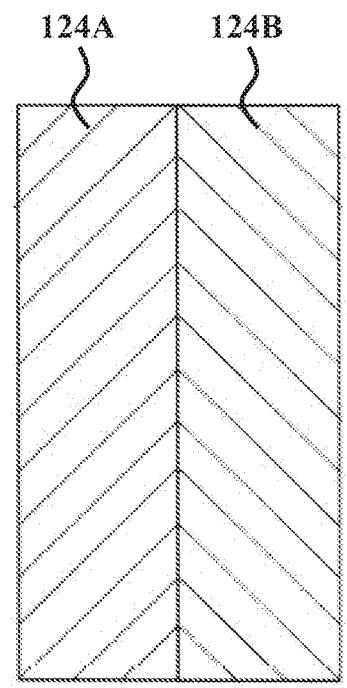
Figure 3H:
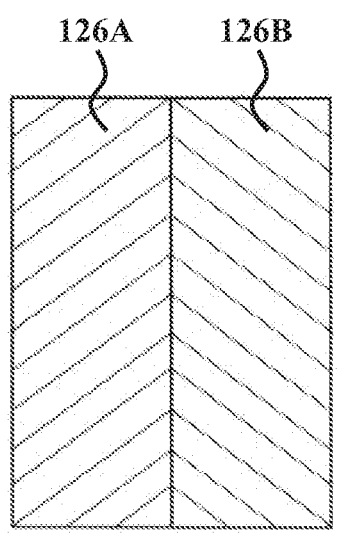

In this connection, FIGS. 3F to 3H show schematic cross-sections taken along lines A-A, B-B and C-C (FIG. 3A). As can be seen, each of the elements L1, L2 and 126 comprises two layers of cardboard, while elongated element L1 also includes the reinforcing rod 123 that may be made of cardboard but may also be made of wood and other materials. The reinforcing member in this specific embodiment has a circular cross-section. It should, however, be noted that it may have oval or other rounded cross-sectional shapes. Generally, the elongated element L1 has features of the structural element of the co-owned application and its contents are incorporated herein by reference for its pertinent parts.

The front and rear frame parts 120 and 140 are assembled together in the manner shown in FIG. 2, through use of a plurality of pins 180 (seen in FIG. 1 and which may be made of cardboard, wood or other materials) that fit into designated through-bores 125A, 125B, 125C in frame parts 120, 140. Frame parts 120, 140 have overlapping portions and tight association may be ensured by applying adhesive AD on juxtaposed surfaces at these portions.

In particular, as shown in FIG. 3B, the front portion of the frame part 120 comprises four longitudinally-oriented blind holes 125A in cardboard portion 124A and 124B and four bores 125B normal to holes 125A and the side surface of part 120. This set of holes and bores serves for articulation to the front frame part 120 of the steering arrangement 110 through the use of pins (not shown) that protrude from the stem of the steering arrangement and the flaps 115 extending from the steering arrangement and attached to the side surfaces of part 120.

End portion 127L1 is formed with eight through-bores 125C also perpendicular to and passing through both portions 124A, 124B, and configured for attachment to a corresponding end portion 147L1 of the rear frame part 140.

Rounded end portion 127L2 is provided with six through-bores perpendicular to and passing through both portions 124A, 124B, arranged circumferentially about the circular portion 127L2 and configured for attachment to a corresponding end portions 147L2' of two rear frame parts 140, to jointly form a crank assembly seat 172 for crank 170.

Figure 5A:
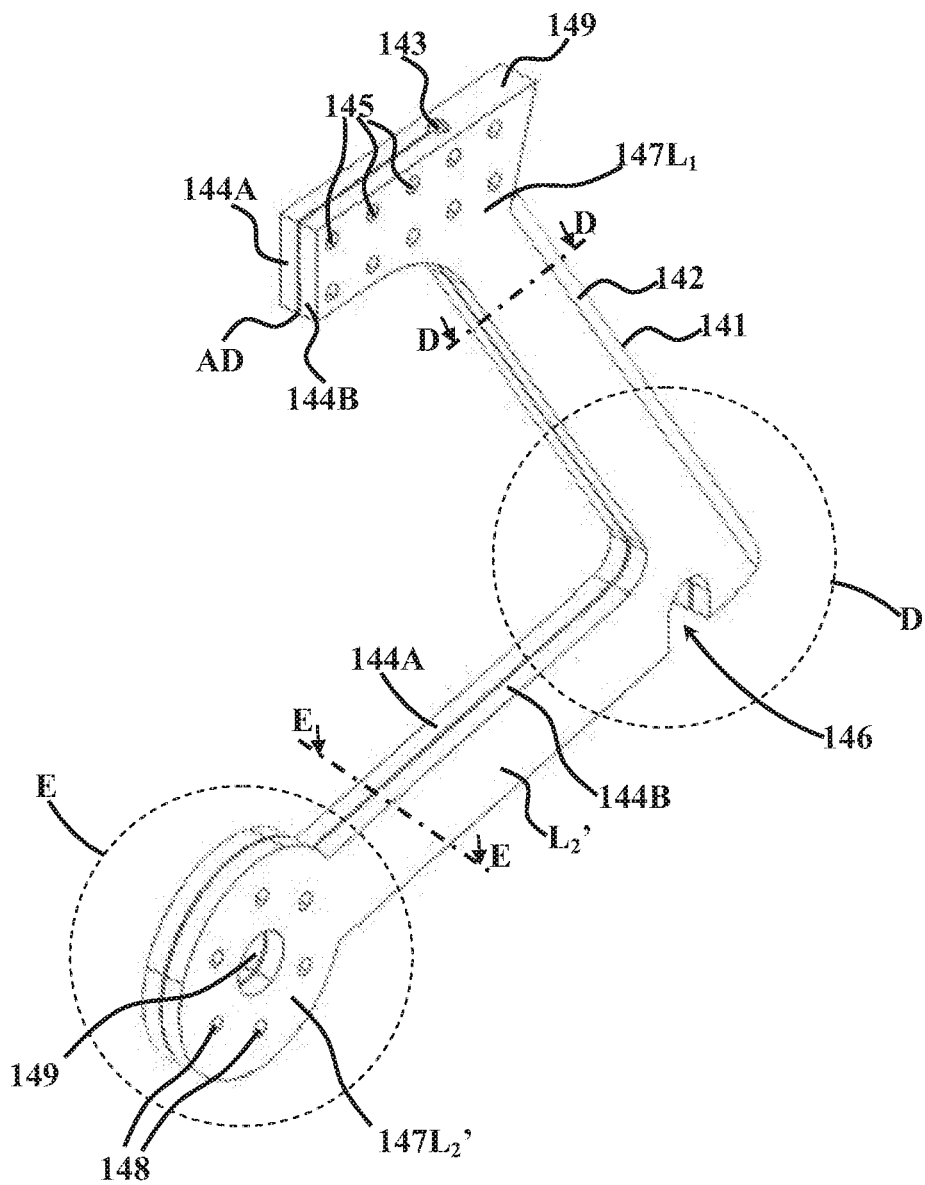
FIG. 5A is a schematic isometric view of a rear frame component of the frame shown in FIG. 2.
Figure 5B:
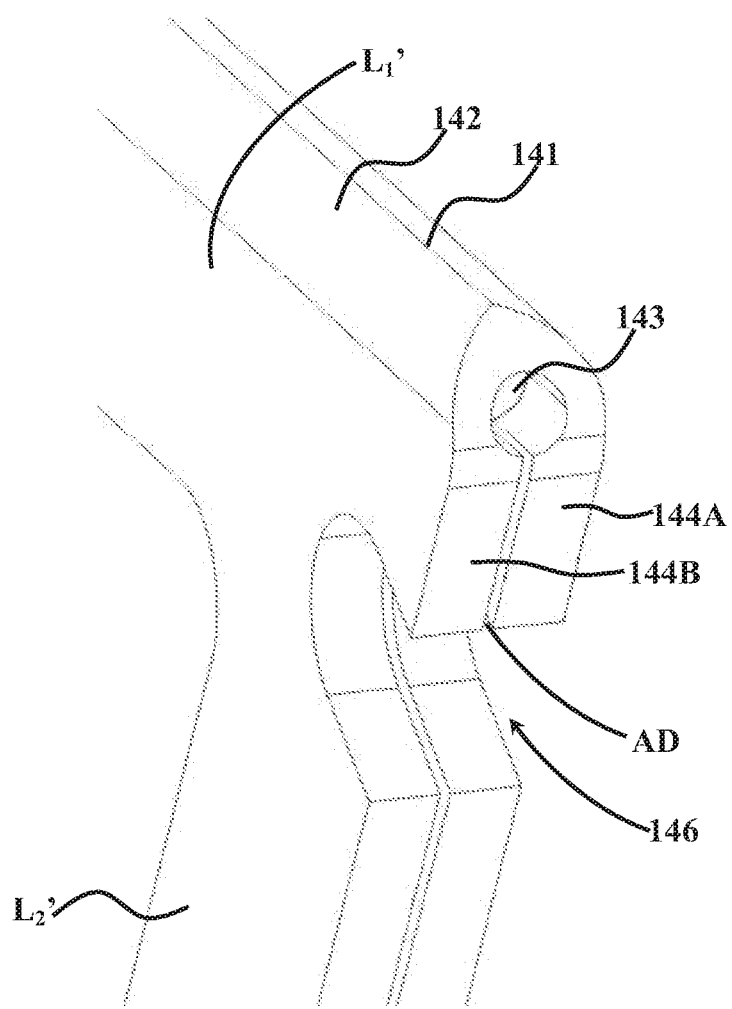
FIG. 5B is a schematic enlarged view of a detail D shown in FIG. 6A.
Figure 5C:
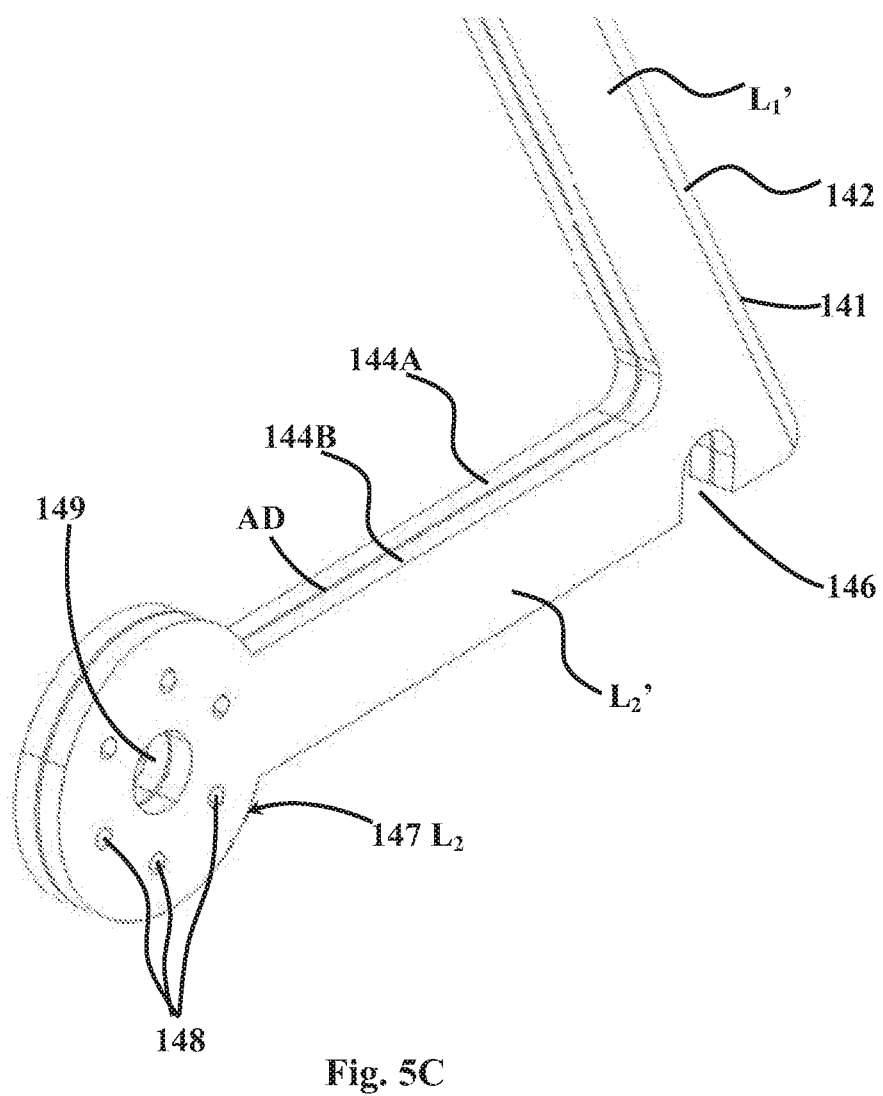
FIG. 5C is a schematic enlarged view of detail E shown in FIG. 6A.

Rear frame part 140 is shown, in isolation, in FIGS. 5A-5C. While differently configured, like frame part 120 it is constructed out of a single, two-layered cardboard piece. Frame part 140 is then cut out from that piece such that the fold region 141 with a reinforcing member embraced by cardboard sheet portions eventually forms the elongated element L1, similarly as the fold region 121 forms the elongated element L1 of part 120. For this reason, equivalent elements between the parts will be designated by similar reference numerals upped by 20, i.e. cardboard portion 124A of the front frame 120 is equivalent to cardboard portion 144A of rear frame part 140.

The rear frame part 140 also comprises two longitudinal members L1' and L2' with, respective, end portions 147L1', 147L2' configured for attachment to the respective end portions 127L1, 127L2 of the front frame part 120.

As previously explained with respect to FIGS. 4A and 4B, the entire rear frame part 140 is also made of a single sheet of cardboard 144 folded about a reinforcing rod 143, extending along a fold region 141 of the cardboard sheet 144.

Once the sheet 144 has been folded and the portions thereof 144A, 144B are affixed to one another it can then be cut to the required shape of the rear frame part 140. A rear triangular piece is the attached to the cut-out structure to constitute triangular projection 149.

Figure 5D:
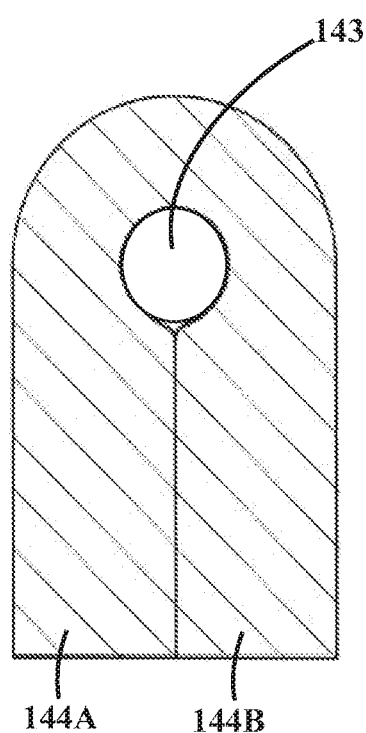
FIGS. 5D to 5E show schematic cross-sections taken along lines D-D and E-E and F-F, respectively, of FIG. 5A.
Figure 5E:
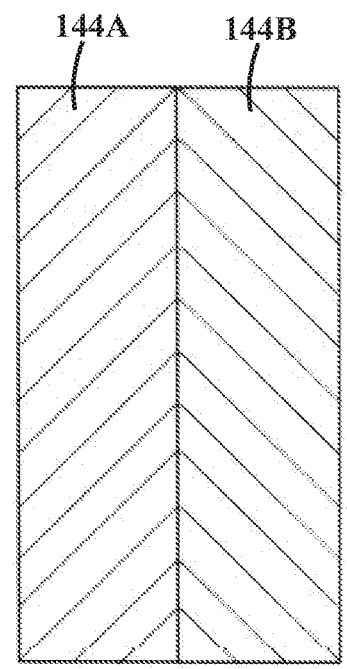

Elongated member L1' has, thus, the reinforcing rod 143 passing along the full length thereof and includes the fold region 141, whereas the elongated member L2' is formed of a double-layer cardboard without a reinforcing rod passing therethrough. This can be seen, in particular, in FIGS. 5D and 5E.

The rear frame part 140 is also formed with an axle-port 146 configured for receiving therein a rear axle of the bicycle 100 of rear wheel 160.

The front and rear frame parts 120 and 140 are assembled together in the manner shown in FIG. 2, through use of a plurality of pins 180 (some of which are seen in FIG. 1 and which may be made of cardboard, wood, plastic and other materials) that fit into designated bores 125A, 125B, 125C, 128, 145, 148 in the different frame parts 120, 140. The different frame parts 120, 140 have overlapping portions and tight association may be ensured by passing the pins 180 through the bores and by applying adhesive AD on juxtaposed surfaces at these portions; and also through other means.

As previously mentioned, the rear frame comprises two mirror image frame parts 140, being attached to opposite sides of the front frame part 120. Among others, this provides for a robust stable construction of the frame reinforcing the front frame part 120 on both sides and (the gap between the mirror image frame parts 140 receives therebetween the rear wheel 160).

The assembled frame 102 comprising the two frame parts 120, 140 forms together a closed-contour structure, including the two reinforcing members 123, 143 provides for a robust construction configured for supporting considerable loads. In particular, the frame 102 can support the weight of at least two adult males (about 200 Kg) and/or properly transferring this weight to the wheels 160 of the bicycle 100.

The invention claimed is:

1. A planar structure comprising:
   two or more, generally elongated elements that are angled with respect to one another in a plane defined by the planar structure integral with one another, and
   formed from a planar multi-layered cardboard-based piece, that is constituted by a single cardboard sheet folded about a longitudinal reinforcing member to firmly embrace and close around the longitudinal reinforcing member to define a fold region at an edge of the planar multi-layered cardboard-based piece,
   the planar structure being cut out as an integral planar structure from the planar multi-layered cardboard-based piece such that at least a first element of said two or more elongated elements extends along and comprises the fold region,
   the planar structure further comprising a cardboard support element extending between said first and at least one other of the elongated elements.

2. The structure of claim 1, wherein said reinforcing member has a rounded cross-section.

3. The structure of claim 1, wherein said reinforcing element extends the length of said first element.

4. The structure of claim 1, wherein one or more of said elongated members has free ends connectable to other structures or other structural elements.

5. The structure of claim 1, wherein at least the first elongated element has load-bearing or bend-resistance property that is significantly larger than that of the longitudinal reinforcement member.

6. The structure of claim 1, being capable of supporting a load in a direction perpendicular to said first elongated element, which is at least 10 times the weight of said structure.

7. The structure of claim 1, comprising an external coating.

8. The structure of claim 7, wherein the external coating comprises at least one of a fire-resistant coating, liquid-resistant coating, scratch-resistant coating and other environmentally resistant coating.

9. The structure of claim 1, being a component of a frame of a human-powered vehicle.

10. The structure of claim 8, wherein at least one end of at least one of the elongated elements is configured for articulation to a pedal crank.

11. A frame for a human-powered vehicle, comprising two or more structures according to claim 1.

12. The frame of claim 11, sized and shaped for a human rider.

13. A planar structure comprising:
   two or more, generally elongated elements that are angled with respect to one another in a plane defined by the planar structure integral with one another, and
   formed from a planar multi-layered cardboard-based piece, that is constituted by a single cardboard sheet folded about a longitudinal reinforcing member to firmly embrace and close around the longitudinal reinforcing member to define a fold region at an edge of the planar multi-layered cardboard-based piece,
   the planar structure being cut out as an integral planar structure from the planar multi-layered cardboard-based piece such that at least a first element of said two or more elongated elements extends along and comprises the fold region,
   at least the first elongated element has load-bearing or bend-resistance property that is significantly larger than that of the longitudinal reinforcement member.

14. The structure of claim 13, wherein said reinforcing member has a rounded cross-section.

15. The structure of claim 13, wherein said reinforcing element extends the length of said first element.

16. The structure of claim 13, further comprising a cardboard support element extending between said first and at least one other of the elongated elements.

17. The structure of claim 13, wherein one or more of said elongated members has free ends connectable to other structures or other structural elements.

18. The structure of claim 13, being capable of supporting a load in a direction perpendicular to said first elongated element, which is at least 10 times the weight of said structure.

19. The structure of claim 13, comprising an external coating.

20. The structure of claim 13, being a component of a frame of a human-powered vehicle, optionally wherein at least one end of at least one of the elongated elements is configured for articulation to a pedal crank.

* * * * *